United States Patent
Lichtman et al.

(10) Patent No.: US 11,894,916 B2
(45) Date of Patent: Feb. 6, 2024

(54) MULTI-BAND OPTICAL NETWORK INTERFACE

(71) Applicant: ECI Telecom Ltd., Petah Tikva (IL)

(72) Inventors: Eyal Lichtman, Petah Tikva (IL); Rafi Leiman, Ness-Ziona (IL); Boaz Wittenberg, Petah Tikva (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 17/818,212

(22) Filed: Aug. 8, 2022

(65) Prior Publication Data

US 2023/0171017 A1    Jun. 1, 2023

Related U.S. Application Data

(63) Continuation of application No. 17/520,083, filed on Nov. 5, 2021, now Pat. No. 11,444,717.

(60) Provisional application No. 63/198,754, filed on Nov. 10, 2020.

(51) Int. Cl.
 *H04J 14/02* (2006.01)

(52) U.S. Cl.
 CPC ...... *H04J 14/0221* (2013.01); *H04J 14/0212* (2013.01); *H04J 14/0213* (2013.01)

(58) Field of Classification Search
 CPC ................................................. H04J 14/0221
 See application file for complete search history.

(56) References Cited

U.S. PATENT DOCUMENTS

| | | |
|---|---|---|
| 7,123,834 B2 | 10/2006 | Hullin et al. |
| 10,237,633 B2 | 3/2019 | Chedore et al. |
| 10,826,641 B1 | 11/2020 | Al Sayeed et al. |
| 11,444,717 B2 * | 9/2022 | Lichtman ............ H04J 14/0221 |
| 2006/0051093 A1 | 3/2006 | Manna |
| 2013/0058647 A1 | 3/2013 | Boertjes et al. |
| 2014/0328587 A1 | 11/2014 | Magri et al. |
| 2020/0194961 A1 | 6/2020 | Luo et al. |

OTHER PUBLICATIONS

International Search Report and Written Opinion of the International Searching Authority received in PCT/IB2021/000775, dated Apr. 28, 2022 (16 pgs.).

* cited by examiner

*Primary Examiner* — Shi K Li
(74) *Attorney, Agent, or Firm* — Finnegan, Henderson, Farabow, Garrett & Dunner, LLP

(57) ABSTRACT

The disclosed systems and methods support addition of bands to a multi-band optical interface. The systems and methods can include a multi-band interface device for optical networks. The device can include a multi-band optical amplifier, a C-Band Add/Drop multiplexer, an L-Band Add/Drop multiplexer and an amplifier noise source. The multi-band optical amplifier can be connected to the C-Band Add/Drop multiplexer and connected to the L-Band Add/Drop multiplexer through the amplifier noise source. The amplifier noise source be configured to generate a combination of bulk noise and an input transmission received from the L-Band Add/Drop multiplexer. The gain of the amplifier noise source can depend on the power of the received input transmission. The power of the received input transmission can be increased over a period of time, transitioning the amplifier noise source from acting as a bulk noise source to acting an amplifier.

18 Claims, 4 Drawing Sheets

MULTI-BAND OPTICAL NETWORK INTERFACE

CROSS-REFERENCE TO RELATED APPLICATION

This application is a continuation of U.S. application Ser. No. 17/520,083 filed on Nov. 5, 2021, which claims the benefit of U.S. Provisional Patent Application No. 63/198,754, filed Nov. 10, 2020. Each application identified above is incorporated by reference herein in its entirety.

TECHNICAL FIELD

The disclosed systems and methods concern optical networking. In particular the disclosed systems and methods concern optical interfaces that use multiplexers to add and remove C-Band and L-Band optical transmissions from an optical network.

BACKGROUND

Optical networks can use multiple bands of the optical spectrum. As channels in one band are filled, channels can be added in another band. However, communications in the bands are not independent. Phenomena such as Stimulated Raman Scattering (SRS) can degrade the performance of the channels in one band when channels in another band are used. Calibrating the optical network to function with a nominal power level for each channel can compensate for such phenomena. Initial traffic demands, however, may be satisfied using a single band. To ensure the system functions with a nominal power level for each channel (in accordance with the calibration), the system can load the additional band(s) with channelized or bulk noise.

SUMMARY

Systems and methods that support the addition of bands to a multi-band optical interface are disclosed. The systems and methods can use an amplifier noise source that transitions from generating bulk noise to amplifying received signals.

The disclosed embodiments include a multi-band interface device for optical networks. The device can include an optical amplifier. The optical amplifier can include first ingress ports configured to receive optical transmissions in multiple transmission bands. A first port of the first ingress ports can be configured to receive a first optical input transmission in a first band of the multiple transmission bands. The optical amplifier can include a first egress port configured to provide first optical output transmissions in the multiple transmission bands. The device can include an amplifier noise source. The amplifier noise source can include a second ingress port configured to receive a second optical input transmission in the first band. The amplifier noise source can further include a second egress port communicatively connected to the first port of the optical amplifier. The amplifier noise source can be configured to generate the first optical input transmission by amplifying a combination of a noise and the second optical input transmission. The magnitude of the amplification can be dependent on a power of the second optical input transmission.

The disclosed embodiments include an optical network interface. The optical network interface can include an amplifier. The amplifier can include an amplifier ingress port configured to receive a first L-Band optical input transmission. The optical network interface can include an amplifier noise source. The amplifier noise source can include an amplifier noise source ingress port configured to receive a second L-Band optical input transmission. The amplifier noise source can further include an amplifier noise source egress port communicatively connected to the amplifier ingress port. The amplifier noise source can be configured to generate the first L-Band optical input transmission by amplifying a combination of a noise and the second L-Band optical input transmission. The first L-Band optical input transmission can include a variable noise fraction inversely dependent on a power of the second L-Band optical input transmission. The optical network interface can include an optical multiplexer. The optical multiplexer can include a multiplexer egress port. The multiplexer egress port can be configured to provide the second L-Band optical input transmission. The optical network interface can include at least one processor and at least one non-transitory computer readable medium containing instructions. When executed by the at least one processor, the instructions can cause the optical network interface to perform operations. The operations can include receiving an instruction to activate the optical multiplexer; and in response to the instruction, increasing the power of the second L-Band optical input transmission over a time interval.

The disclosed embodiments include a method of optical network management. The method can include an operation of deploying a node on an optical network. The node can include a multi-band amplifier connected to a first noise source through a first optical switch. The first noise source can be configured to provide first noise in a first band. The node can further include an amplifier noise source. The amplifier noise source can include an input and can be configured to generate a constant power output in a second band by amplifying a combination of an input signal received at the input and an amplifier noise of the amplifier noise source. The method can include an additional operation of calibrating the multi-band amplifier, while providing to the multi-band amplifier: the first noise in the first band generated by the first noise source; and the constant power output in the second band generated by the amplifier noise source. The method can include an additional operation of connecting a second optical switch to the input of the amplifier noise source. The method can include an additional operation of providing, from the second optical switch to the amplifier noise source as the input signal, a channelized noise in the second band. The method can include an additional operation of increasing an amplitude of the channelized noise to a nominal level over a time interval.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, are not necessarily to scale or exhaustive. Instead, emphasis is generally placed upon illustrating the principles of the embodiments described herein. The drawings illustrate several embodiments consistent with the disclosure and, together with the description, serve to explain the principles of the disclosure. In the drawings.

DETAILED DESCRIPTION

Figure 1:
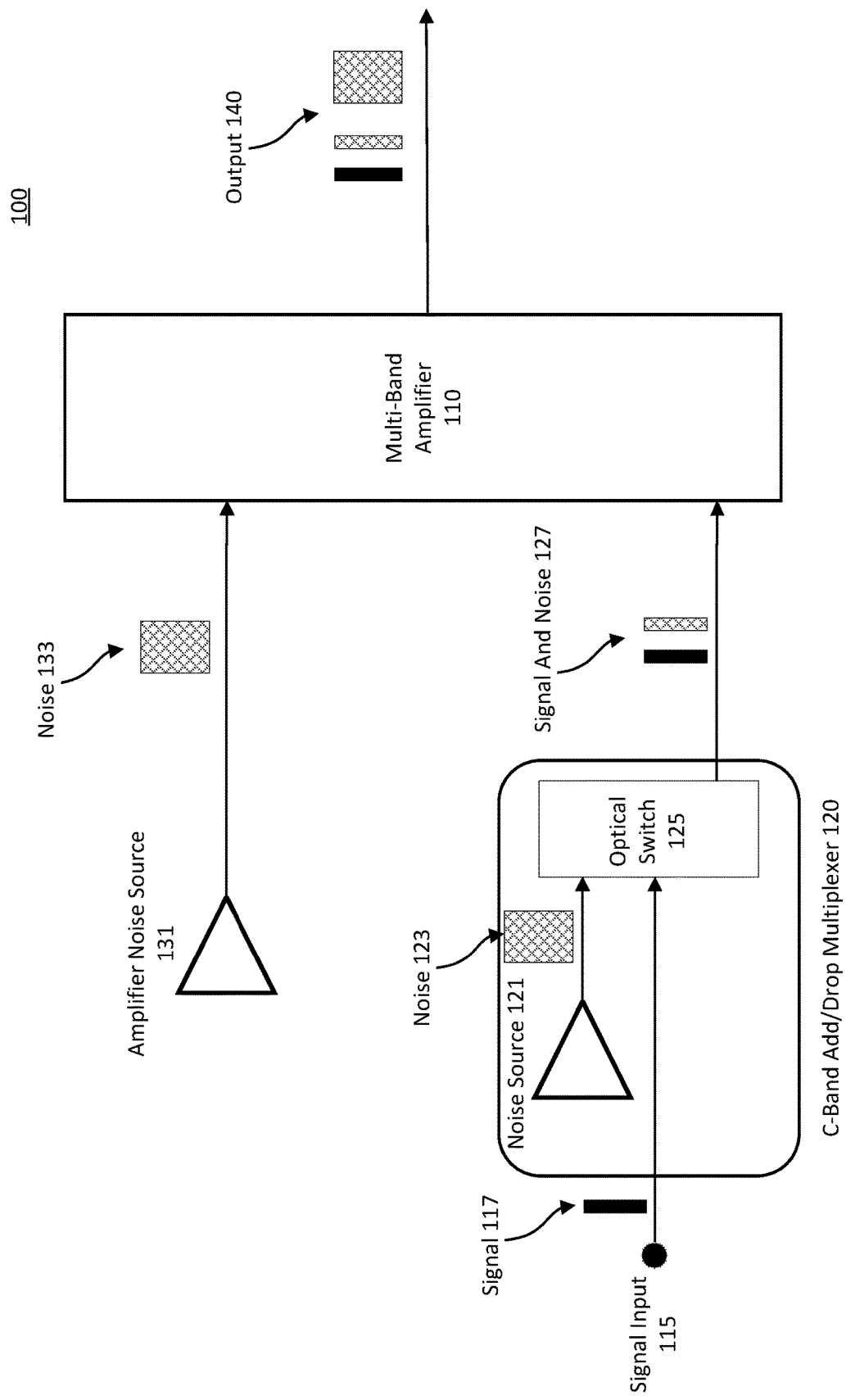
FIG. 1 depicts a schematic of an exemplary initial deployment of an optical network interface, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

Optical networks can use multiple bands of the optical spectrum. As channels in one band are filled, channels can be added in one or more other bands. However, communications in the bands are not independent. Populating channels in a second band with communication signals can degrade the performance of the channels in a first band. For example, C-Band channels can exhibit a performance shift due to Stimulated Raman Scattering (SRS) when new L-Band channels are added. SRS can transfer power from shorter-wavelength channels (e.g., C-Band channels) to longer-wavelength channels (e.g., L-Band channels), causing signal amplitudes to decrease as a function of increasing channel wavelength. This transfer (e.g., an "SRS tilt") can reach 3 dB or more and can affect channels in both the C-Band and L-Band.

The technical problem posed by SRS tilt can be addressed by calibrating the optical network to function with a nominal power level for each channel. In some instances, for example, an optical network interface (e.g., node) can be provisioned with full-power C-Band and L-Band signals upon deployment. The C-Band signals can include channelized noise (and optionally signals, if such signals are available upon deployment). An L-Band signal can include bulk (e.g., not-channelized) noise (e.g., amplified spontaneous emission noise). Calibration can include adjusting gains for amplifiers in the optical network interface to compensate for any SRS tilt in the network. When a C-Band channel is not being used, channelized noise with a nominal power level can be provided in that channel. When the L-Band is not being used, bulk noise with a nominal power level can be provided in that band. In such embodiments, the total power in the network can be approximately constant, thus ensuring that the power-dependent SRS tilt remains approximately constant. In this manner, the optical network can be maintained in the state for which it was calibrated.

However, this approach presents a problem for service providers. A service provider may not initially need multiple bands. Instead, they may add bands as network traffic grows and additional capacity is required. While a service provider could deploy equipment sufficient to support multiple bands immediately, such an approach would increase complexity, waste resources, and commit the service provider to the current state of the art technology (when improved equipment may be available in the future). As an alternative, a service provider could deploy some multi-band equipment while deferring deployment of the remaining equipment until it is needed. For example, the service provider could deploy multi-band amplifiers. One band could be populated with signals, while the other band could be loaded with bulk noise. In this manner, the deployment of equipment for managing communications in the unused band (e.g., ROADM or OADM equipment, or the like) could be deferred.

Unfortunately, loading unused bands using bulk noise sources can hinder subsequent system upgrades. When deploying equipment for managing the previously unused band, the bulk noise source may be removed or deactivated. But removing or deactivating the bulk noise source may disrupt the performance of the network until the new equipment is operational.

Addressing these technical problems, the disclosed embodiments support an improved upgrade process that can avoid or reduce disruption or degradation of network performance during installation of new equipment. In some embodiments, an amplifier noise source can be used to load an unused channel. The amplifier noise source can include an input and can be configured to provide a constant power output. When no input is provided, the amplifier noise source can amplify noise (e.g., input or system noise) and thereby act as a bulk noise source. The new equipment can be configured to provide a signal to the input of the amplifier noise source. The power of this output can be progressively increased. The power can progressively increase from a zero or non-zero value (e.g., a value approximately equal to or greater than the input or system noise of the amplifier noise source). As power to the input of the amplifier noise source increases, the gain on the amplifier noise source decreases, to maintain the constant power output. The relative contribution of noise and the signal changes, as the signal becomes increasingly dominant. Eventually, in some embodiments, the input signal can reach the nominal power level of the communication network and the gain on the amplifier can decrease to approximately unity.

As a non-limiting example, a C+L amplifier can be configured to receive bulk noise from an L-Band amplifier noise source and signals or channelized noise from a C-Band optical multiplexer. The output of an L-Band optical multiplexer can then be connected to the input of the amplifier noise source. A bulk noise source can be connected to an input of the L-Band optical multiplexer, enabling the L-Band optical multiplexer to provide channelized noise to the amplifier noise source. The power level of this channelized noise can be increased (at the bulk noise source, the L-Band optical multiplexer, the input to the amplifier noise source, or elsewhere in the optical path), converting the amplifier noise source from a noise source to an amplifier with a predetermined gain. The power level of the channelized noise can be increased over a period of 50 ms to 50 seconds, or more preferably 500 ms to 5 seconds. In this manner, the disclosed embodiments can support upgrading optical networks to use additional bands without requiring recalibration of the network or risking network interruptions or degraded performance.

FIG. 1 depicts a schematic of an exemplary initial deployment of an optical network interface 100, consistent with disclosed embodiments. Upon initial deployment, optical network interface 100 can include a multi-band amplifier 110, a C-Band Add/Drop Multiplexer 120 (e.g., multiplexer 120), and an amplifier noise source 131. Optical network interface 100 can be calibrated to support nominal amounts of power in the C-Band and L-Band. Initially, however, optical network interface 100 may only receive a limited amount of C-Band signals. Accordingly, channelized noise and bulk noise can be used to ensure that the nominal amounts of power in the C-Band and L-Band are transmitted.

Multi-band amplifier 110 can be or include one or more optical amplifiers configurable to amplify input optical transmissions. Multi-band amplifier 110 may include, for each transmission band, an optical amplifier configured to amplify that transmission band (e.g., a C-Band amplifier for C-Band transmissions and an L-Band amplifier for L-Band transmissions). Alternatively or additionally, multi-band amplifier 110 may include an optical amplifier configured to amplify transmissions in multiple transmission bands. Multi-band amplifier 110 can include ingress ports configured to receive optical transmissions in multiple transmission bands. In some embodiments, multi-band amplifier 110 can include an ingress port for C-Band optical transmissions and an ingress port for L-Band optical transmissions. The optical transmissions can include signals or noise. The optical transmissions can be channelized (e.g., channelized signals or noise) in that the power spectrum for such signals or noise can exhibit regions of transmission separated by regions of attenuation. For example, the C-Band may include 40 channels each separated by 100 GHz (~0.8 nm wavelength difference) or 80 channels separated by 50 GHz (~0.4 nm wavelength difference). In contrast, a power spectrum for bulk noise may lack regions of transmission separated by regions of attenuation. Instead, the power spectrum for bulk noise may be approximately constant over a particular band (e.g., the power spectrum of a C-Band noise source can be approximately constant over the approximately 1530 nm to 1565 nm C-Band). In some embodiments, the optical transmissions can include such bulk noise. Multi-band amplifier 110 can include an egress port configured to output optical transmissions. The output optical transmissions provided through the egress ports can be in the multiple transmission bands (e.g., in the C-Band and the L-Band).

Multiplexer 120 can be a C-Band add/drop multiplexer (e.g., a ROADM, OADM, or the like), consistent with disclosed embodiments. Such a multiplexer can be configurable to route input optical transmissions on multiple wavelength channels to an egress port. Multiplexer 120 can be configured to drop transmissions, separating them from a combined input transmission and passing them to a separate egress port or network. Multiplexer 120 can be configured to add transmissions received through an ingress port to a combined output transmission (which can be provided to an output egress port). As depicted in FIG. 1, multiplexer 120 can be configured to receive a signal 117 through signal input 115.

Multiplexer 120 can include an optical switch 125, consistent with disclosed embodiments. In some embodiments, optical switch 125 can be configured to route signals from multiple ingress ports to a common egress port. Optical switch 125 can be configured to switch signals in the L-Band (e.g., 1530 to 1565 nm). Optical switch 125 can be a wavelength selective switch and can be implemented using Microelectromechanical Mirrors, binary liquid crystal, liquid crystal on silicon, or another suitable implementation. In some embodiments, optical switch 125 can have an ingress port configured to receive optical transmissions from signal input 115 and an ingress port configured to receive bulk noise from a noise source. In various embodiments, optical switch 125 can have an egress port. The egress port can be configured to output optical transmissions to the C-Band optical transmission ingress port of multi-band amplifier 110. As may be appreciated, routing bulk noise through optical switch 125 can convert the bulk noise to channelize noise, as only the noise within selected channels may be routed to the one or more egress ports. At least initially, upon deployment, the output transmission can include a combination of channelized noise and signals (e.g., multiplexer output 127 can include, as shown in FIG. 1, a combination of a signal channel and channelized noise).

Multiplexer 120 can include a noise source 121. Noise source 121 can be an amplified spontaneous emission (ASE) noise source. In some implementations, noise source 121 can be an Erbium-Doped Fiber Amplifier with no input, or another suitable noise source. In some embodiments, noise source 121 can be a C-Band noise source configured to produce bulk C-Band noise. Noise source 121 can include an egress port, which can be connected to an ingress point of optical switch 125.

While described herein as being an optical add/drop amplifier, the functionality of multiplexer 120 can be implemented using a less-complicated device (e.g., a multiplexer lacking drop functionality, or the like). In some embodiments, for example, individual components can be used in place of the optical add/drop amplifier (e.g., an individual noise source can be configured to interoperate with a separate optical switch).

Amplifier noise source 131 can be an amplifier configurable to transition between acting as a noise source and acting as an amplifier, consistent with disclosed embodiments. In some embodiments, amplifier noise source 131 can be or include an ASE amplifier. Amplifier noise source 131 can include an egress port, which can be connected to multi-band amplifier 110. Amplifier noise source 131 can further include an ingress port. In the initial configuration, the ingress port can be disconnected, blanked-off, connected to null termination, or otherwise disconnected from optical transmission sources.

In some embodiments, amplifier noise source 131 can be a constant power amplifier. Amplifier noise source 131 can be configured to attempt to provide a constant power output at the egress port, regardless of the input signal received at the ingress port. Accordingly, when no input is provided, as depicted in FIG. 1, a variable gain of the amplifier noise source 131 can be set at a maximum value. As a result, noise present in amplifier noise source 131 may be amplified to generate a bulk noise output. In contrast, when input transmissions are provided, the variable gain can depend on the power of the input transmissions. In some embodiments, when the input power and the output power are approximately equal, the gain can be approximately unity. In this manner, amplifier noise source 131 can be configured to maintain, as the power of the input optical transmission received at the ingress port increases (e.g., to an operating level of the optical network interface 100) a power of the output (e.g., noise 133) within a specified range.

In some implementations, amplifier noise source 131 can include an output sensor and be configured with a variable gain. The output sensor can be configured to measure the amplitude of the output. The measured output can be used to generate an output power measurement. In some embodiments, the output sensor can be a photodiode. The photodiode can be a wideband photodiode and can measure a level of the optical signal across a wide range of wavelengths. Accordingly, the measured optical signal can indicate the power of the output. The variable gain can be automatically adjusted to ensure that the measured output power satisfies an output power criterion (e.g., the measured output power remains within a specified range, below a specified threshold, tracks a specified value, or another suitable criterion).

In some implementations, amplifier noise source 131 can include an input sensor. The input sensor can be configured to measure the amplitude of the input. The measured input can be used to generate an input power measurement. In some embodiments, the input sensor can be a photodiode. The photodiode can be a wideband photodiode and can measure a level of the optical signal across a wide range of wavelengths. Accordingly, the measured optical signal can indicate the power of the input. In such implementations, the variable gain can be automatically adjusted based on the measured input power to ensure that the output power satisfies the output power criterion.

In some implementations, amplifier noise source 131 can include both the input sensor and the output sensor. In such implementations, amplifier noise source 131 can be configured to determine an input power and an output power, based on measurements acquired by the input and output sensors. In such implementations, the variable gain can be automatically adjusted based on the measured input and output powers to ensure that the output power satisfies the output power criterion.

Figure 2:
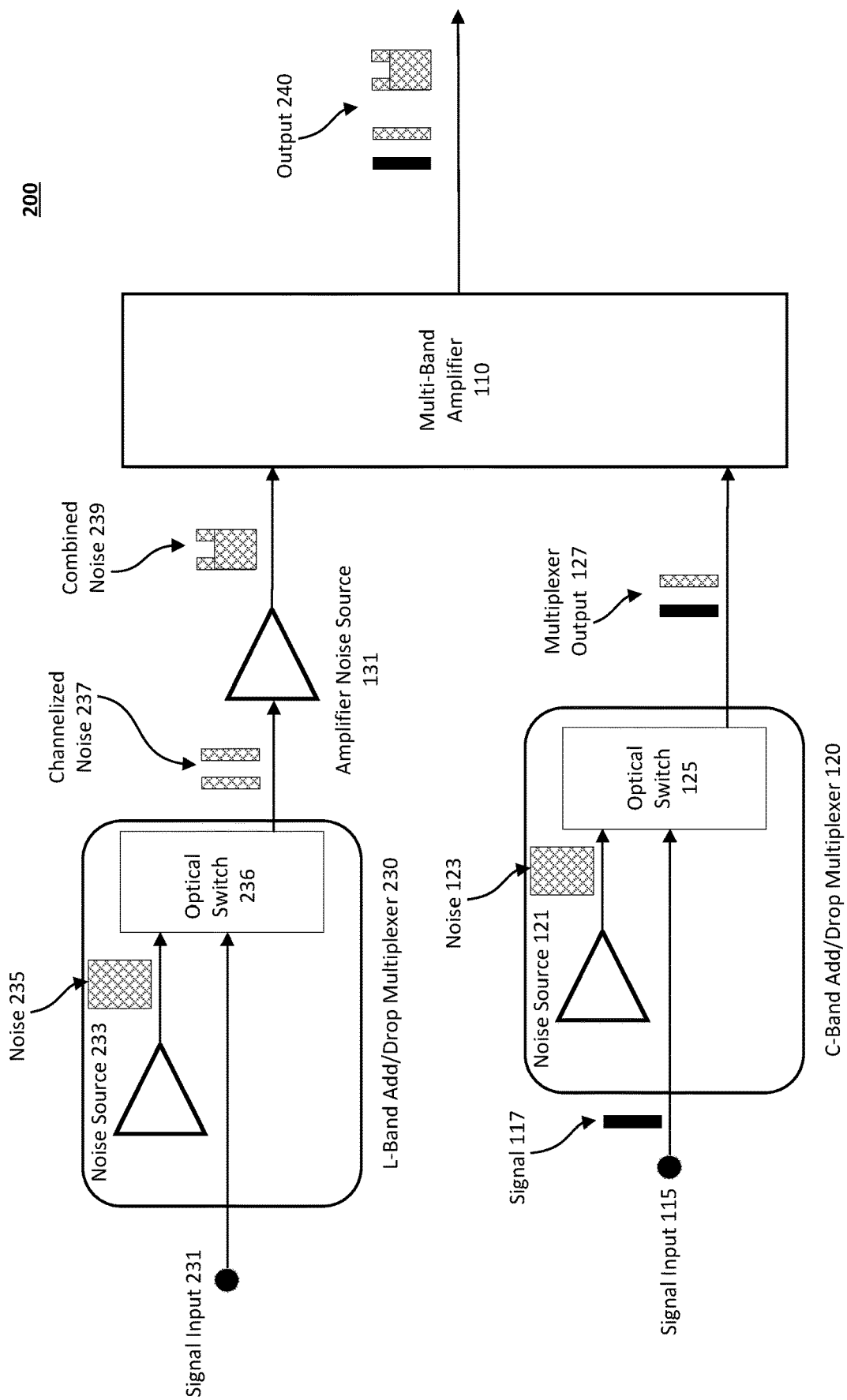
FIG. 2 depicts a schematic of an exemplary deployment of an upgraded optical network interface, consistent with disclosed embodiments.

FIG. 2 depicts a schematic of an exemplary deployment of an upgraded optical network interface 200, consistent with disclosed embodiments. The optical network interface depicted in FIG. 1 can be upgraded to generate optical network interface 200. In some embodiments, the depicted upgrade can be performed in response to increased demand. For example, optical network interface 100 may be upgraded into upgraded optical network interface 200 when optical transmissions are using all (or some threshold fraction) of the available channels supported by multiplexer 120. Alternatively, the depicted upgrade can be performed in anticipation of increased demand. In some embodiments, the depicted upgrade can be performed without disrupting existing network traffic.

As depicted in FIG. 2, upgraded optical network interface 200 can include multi-band amplifier 110 and C-Band add/drop multiplexer 120. These components may continue to function as described above with regards to FIG. 1. While multiplexer 120 is depicted in FIG. 2 as continuing to provide a mix of signal channels and channelized noise (e.g., multiplexer output 127 continues to depict a combination of a signal channel and channelized noise), this depiction is not intended to be limiting. In some instances, optical network interface 100 may be upgraded at least in part due to multiplexer 120 dedicating all C-Band channels to signals. In such instances, multiplexer output 127 may include only signal channels.

Upgraded optical network interface 200 can also include L-Band add/drop multiplexer 230 (e.g., a ROADM, OADM, or the like), consistent with disclosed embodiments. Similar to multiplexer 120, multiplexer 230 can be configurable to route input optical transmissions on multiple wavelength channels to an egress port. The optical transmissions can be signals or noise. Similar to multiplexer 120, multiplexer 230 can be configurable to drop transmissions from a combined input transmission or add transmissions to a combined output transmission. Multiplexer 230 can be configurable to receive a signal (not depicted in FIG. 2) through signal input 231.

Multiplexer 230 can include a noise source 233. Noise source 233 can be an amplified spontaneous emission (ASE) noise source. In some embodiments, noise source 233 can be an L-Band noise source configured to produce bulk L-Band noise. Noise source 233 can include an egress port, which can be connected to an ingress point of an optical switch.

Multiplexer 230 can include an optical switch 236, consistent with disclosed embodiments. In some embodiments, similar to optical switch 125, optical switch 236 can be configured to route signals from multiple ingress ports to a common egress port. Optical switch 236 can be configured to switch signals in the L-Band (e.g., 1565 to 1625 nm). Optical switch 236 can be a wavelength selective switch and can be implemented using Microelectromechanical Mirrors, binary liquid crystal, liquid crystal on silicon, or another suitable implementation. In some embodiments, optical switch 236 can have an ingress port configured to receive optical transmissions from signal input 231 and an ingress port configured to receive bulk noise from noise source 233. In various embodiments, optical switch 236 can have one or more egress ports. At least one of the egress ports can be configured to output optical transmissions to the ingress port of amplifier noise source 131. As described herein, routing bulk noise through optical switch 236 can convert the bulk noise to channelize noise. Multiplexer 230 can be configurable to output channelized noise and/or signals. However, until signals are received from signal input 231, multiplexer 230 may output only channelized noise (e.g., channelized noise 237 as depicted in FIG. 2). In some embodiments, multiplexer 230 can include a variable optical attenuator (VOA) (not depicted in FIG. 1). The VOA can be used to control the power of multiplexer output 127. For example, the VOA can enable the power output of multiplexer 230 to begin at a low level and then increase in a controlled manner.

While described herein as being an optical add/drop amplifier, the functionality of multiplexer 230 can be implemented using a less-complicated device (e.g., a multiplexer lacking drop functionality, or the like). In some embodiments, for example, individual components can be used in place of the optical add/drop amplifier (e.g., an individual noise source can be used together with a separate optical switch).

Consistent with disclosed embodiments, upgraded optical network interface 200 can include amplifier noise source 131. This component may continue to function as described above with regards to FIG. 1. An egress port of amplifier noise source 131 can be connected to the L-Band ingress port of multi-band amplifier 110. However, as depicted in FIG. 2, the ingress port of amplifier noise source 131 can be connected to an egress port of multiplexer 230.

Amplifier noise source 131 can receive output optical transmissions (e.g., channelized noise 237) from multiplexer 230 and output optical transmissions (e.g., combined noise 239) to multi-band amplifier 110, consistent with disclosed embodiments. At least initially, combined noise 239 can be a combination of the bulk noise generated by amplifier noise source 131 and channelized noise 237 received from multiplexer 230.

The relative contribution of bulk noise and channelized noise 237 in combined noise 239 can depend on the variable gain of amplifier noise source 131. Amplifier noise source 131 can be configured to amplify a combination of the bulk noise and channelized noise 237. The magnitude of the amplification (e.g., the variable gain) can depend on the power of channelized noise 237. As an amplitude of channelized noise 237 increases, the variable gain of amplifier noise source 131 can decrease, such that the power of combined noise 239 remains constant. Accordingly, as the power of channelized noise 237 increases, the relative contribution of channelized noise 237 to combined noise 239 can increase.

Figure 3:
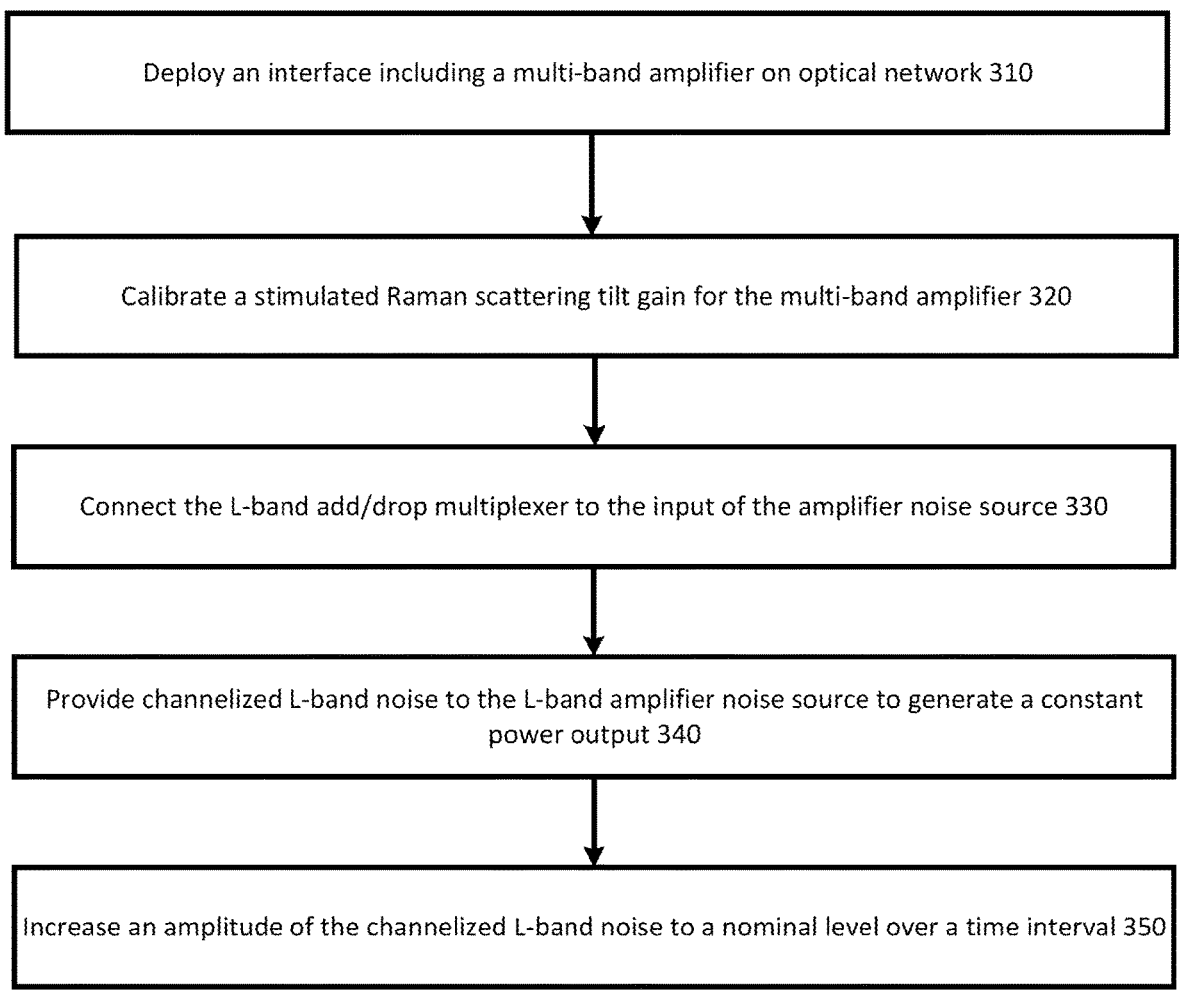
FIG. 3 depicts a flowchart of an exemplary method 300 for deploying and upgrading an optical network interface, consistent with disclosed embodiments.

FIG. 3 depicts a flowchart of an exemplary method 300 for deploying and upgrading an optical network interface, consistent with disclosed embodiments. Method 300 can address the technical problem posed by SRS tilt (or similar performance issues) without requiring a service provider to deploy unnecessary equipment or disrupt the performance of the network during installation of new equipment.

In step 310 of method 300, an optical network interface (e.g., optical network interface 100) can be deployed on an optical network. In some embodiments, the optical network interface can be configured to add signals to (or drop signals from) the optical network. The optical network interface can include a multi-band amplifier (e.g., multi-band amplifier 110) configurable to amplify both C-Band and L-Band optical transmissions. The optical network interface can also include a C-Band add/drop multiplexer (e.g., multiplexer 120) and an amplifier noise source (e.g., amplifier noise source 123). Deployment of the optical network interface can include communicatively connecting the optical network interface to the optical network, such that the output of the optical network interface enters the optical network. Deployment of the optical network interface can further include connecting signal sources (e.g., the outputs of transceivers, transponders, muxponders, or other suitable signal sources) to the ingress port(s) of the multiplexer. The signal sources can be configured to provide multiple channels of C-Band optical transmissions for routing into the optical network. The disclosed embodiments are not limited to any particular method of deploying the optical interface. The particular method used can depend on the particular implementation of the optical interface.

In step 320 of method 300, the optical network interface can be calibrated to accommodate SRS tilt, or other distortions. In some embodiment, nominal power signals can be provided in each channel of the optical network interface (e.g., on both the C-Band and the L-Band). The signals can be channelized (e.g., test signals or channelized noise) or bulk noise, or a combination thereof. For example, channelized noise can be provided through the C-Band channels using multiplexer 120, while bulk noise is provided in the L-Band using amplifier noise source 123. The disclosed embodiments are not limited to any particular calibration method. In some embodiments, the power in each channel can be measured at a remote node in the optical network (e.g., a remote optical network interface in the optical network). The power measured in each channel at the remote node may differ from the power input into each channel at the optical interface. Based on the measured and input power, a frequency dependent gain of the multi-band amplifier can be adjusted such that the measured power at the remote node for each channel has a desired value. For example, when the measured power exhibits an SRS tilt, the multi-band amplifier can be configured to provide a compensatory tilt, progressively decreasing in gain as wavelength increases. In addition, the multi-band amplifier can be configured to compensate for other wavelength-dependent losses arising from other components of the optical network. As a result of this calibration, channel power, as measured at the remote node in the optical network, may be approximately independent of channel or transmission wavelength. In some embodiments, the calibration may be performed before signals can be routed by the optical network interface into the optical network.

In step 330 of method 300, an L-Band add/drop multiplexer (e.g., multiplexer 230) can be connected to the input of the amplifier noise source. In some embodiments, step 330 can be performed in response to a determination that the optical network interface requires additional capacity. The determination can be based on the existing or anticipated usage of the C-Band channels in the optical interface. The multiplexer can include a noise source (e.g., noise source 233) and an optical switch (e.g., optical switch 236). The disclosed embodiments are not limited to any particular method of connecting the multiplexer to the input of the amplifier noise source. Instead, the particular method can depend on the implementation of the multiplexer and the amplifier noise source.

In step 340 of method 300, the L-Band add/drop multiplexer can provide channelized L-Band noise to the input of the amplifier noise source. In some embodiments, the bulk noise source in the multiplexer can provide bulk noise to the optical switch in the multiplexer. The output of the optical switch can be channelized noise. As depicted below with regards to FIGS. 4A to 4D, an initial power of the channelized L-Band noise may low (e.g., less than two times of the input noise of the amplifier noise, or another suitable value selected such that turning on the noise does not disrupt the operation of the optical network interface or the optical network).

In step 350 of method 300, the power of the channelized L-Band noise can be increased to a nominal level over a time interval. The disclosed embodiments are not limited to any particular method of increasing the power of the channelized L-Band noise. In some embodiments, this channelized L-Band noise power can be increased by increasing the power of the bulk noise output by the noise source. In various embodiments, the channelized L-Band noise power can be adjusted using a VOA interposed between the bulk noise source and the input to the amplifier noise source (e.g., between the multiplexer and the amplifier noise source, or within the multiplexer).

In some embodiments, the nominal level may be the same as the constant power level output by the amplifier noise source. Accordingly, the amplifier noise source can transition to acting as a unity gain amplifier. In various embodiments, the nominal level may differ from the constant power level output by the amplifier noise source. In some embodiments, the time interval can be between 50 ms and 50 seconds, or more preferably between 500 ms and 5 seconds. The increase in the power of the channelized L-Band noise can be linear or non-linear (e.g., a quadratic or other polynomial increase, an exponential increase, or another suitable increase selected to minimize disruption to the optical interface).

As may be appreciated, by increasing the bulk noise power in this manner, the optical signal-to-noise ratio (OSNR) floor (e.g., the log of the ratio of the channelized noise over the bulk noise) at the beginning of the increase is limited by the OSNR of the amplifier noise source and it varies from a low but positive OSNR to the nominal OSNR.

Consistent with disclosed embodiments, following completion of method 300, L-Band optical transmissions can be input to optical network interface 200. Such input transmissions can be received by signal input 231 of multiplexer 230. Multiplexer 230 can be configured to determine a channel for such input transmissions and reduce or prevent transmission of channelized noise on the determined channel. Accordingly, multiplexer 230 may not provide noise on channels being used for signals. As additional L-Band channels are brought into service, the channelized noise output by multiplexer 230 may therefore decrease. The L-Band channels can be output by multiplexer 230 to amplifier noise source 131. The L-Band channels can pass through amplifier noise source 131 to multi-band amplifier 110, where they are amplified according to the previously performed calibration and transmitted into the optical network. In this manner, the optical network interface can be upgraded to include L-Band channels without disrupting the optical network or requiring investment at the time of initial deployment in unneeded L-Band add/drop multiplexers.

Figure 4A:
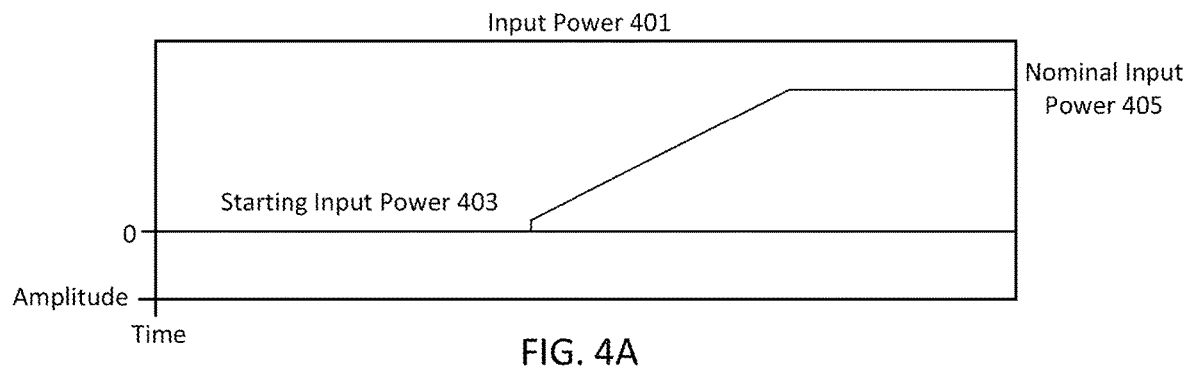
FIGS. 4A to 4D depict exemplary relationships between an input, output, and gain for an amplifier noise source, consistent with disclosed embodiments.
Figure 4B:
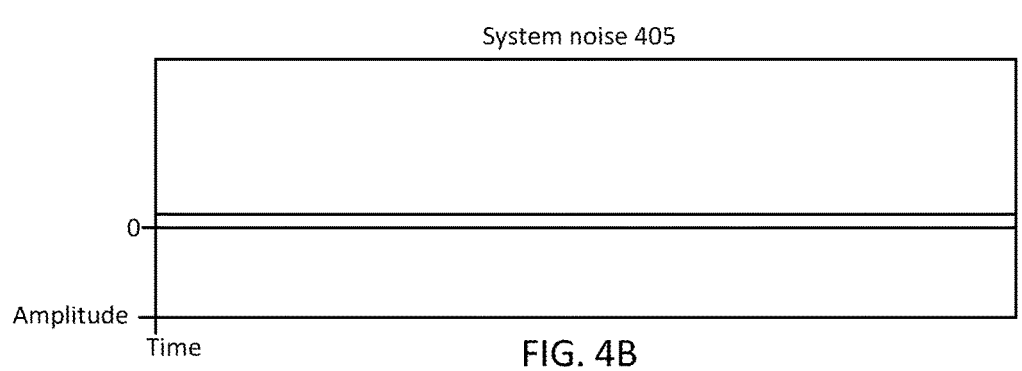
Figure 4C:
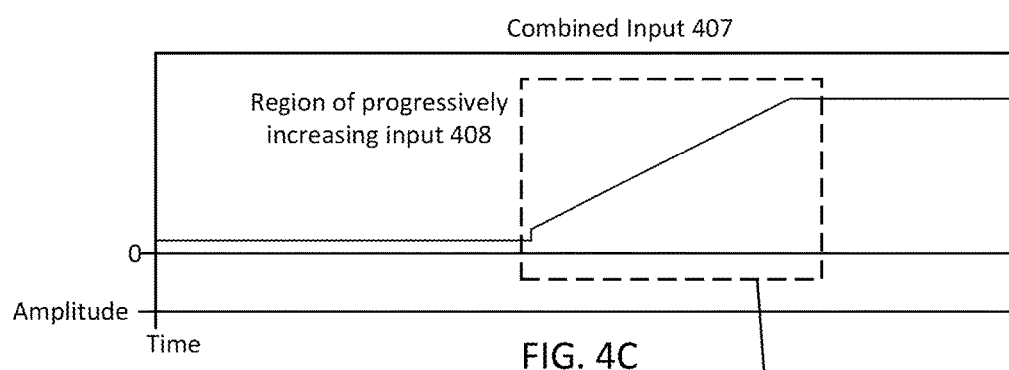
Figure 4D:
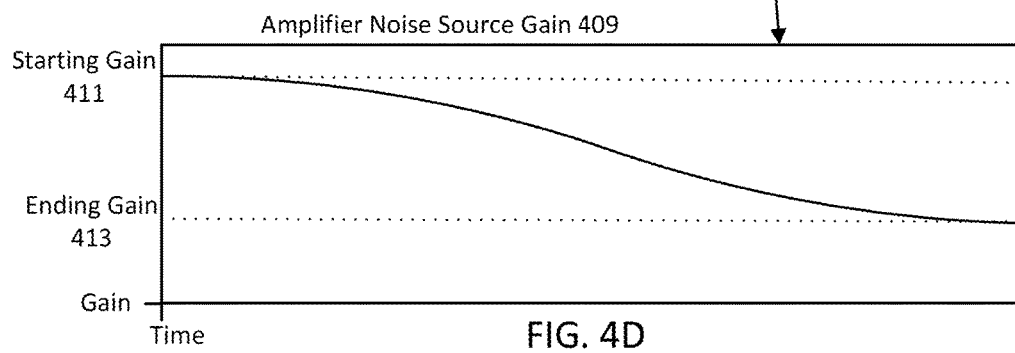

FIGS. 4A to 4D depict exemplary relationships between an input, output, and gain for an amplifier noise source (e.g., amplifier noise source 123), consistent with disclosed embodiments. FIG. 4A depicts the change over time of input power 401 to the amplifier noise source during performance of method 300. As shown, input power 401 can initially be zero, become a small, non-zero value when the L-Band bulk noise source is connected through the optical switch to the input of the amplifier noise source, and then ramp up (linearly, in this example) to a nominal level. FIG. 4B depicts system noise in the amplifier noise source over time during the performance of method 300. The system noise (which is amplified to generate the build ASE noise output by the amplifier noise source) is approximately constant. FIG. 4C depicts the combined input 407 to the amplifier noise source over time during performance of method 300 (e.g., modeling the system noise as if it were an input noise). As shown, the initial input power 401 is comparable to the system noise, but quickly begins to dominate combined input 407. FIG. 4D depicts the amplifier noise source gain over time during the time interval in which input power 401 is increased. As shown, the gain varies between starting gain 411 and ending gain 413. At starting gain 411, the system noise is amplified to the nominal output power. At ending gain 413, the combined input 407, including the nominal power channelized noise, is amplified to the nominal output power. Accordingly, the nominal output power is maintained throughout the transition from bulk to channelized L-Band noise.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A multi-band interface device for optical networks, comprising:
    an optical amplifier including:
        first ingress ports configured to receive optical transmissions in multiple transmission bands, a first port of the first ingress ports configured to receive a first optical input transmission in a first band of the multiple transmission bands; and
        a first egress port configured to provide first optical output transmissions in the multiple transmission bands; and
    an amplifier noise source:
        including a second ingress port configured to receive a second optical input transmission in the first band;
        including a second egress port communicatively connected to the first port of the optical amplifier; and
        configured to generate the first optical input transmission by amplifying a combination of a bulk noise and the second optical input transmission, a magnitude of the amplification being dependent on a power of the second optical input transmission.

2. The multi-band interface device of claim 1, wherein: the bulk noise comprises amplified spontaneous emission noise of the amplifier noise source.

3. The multi-band interface device of claim 1, wherein: the amplifier noise source comprises a constant power amplifier.

4. The multi-band interface device of claim 1, wherein: the amplifier noise source is configured to maintain, as the power of the second optical input transmission increases to an operating level, a power of the first optical input transmission within a specified range.

5. The multi-band interface device of claim 1, wherein:
the first band comprises the L-Band.

6. The multi-band interface device of claim 1, wherein:
the multi-band interface device further comprises:
 a second noise source; and
 an optical switch including:
  a third ingress port communicatively connected to the second noise source and configured to receive a third optical input transmission in the first band; and
  a third egress port, the third egress port communicatively connected to the second ingress port.

7. The multi-band interface device of claim 1, wherein:
the second ingress port is communicatively connected to an L-Band Optical Add/Drop Multiplexer.

8. The multi-band interface device of claim 1, wherein:
the magnitude of the amplification is between 90 dB and 40 dB when the power of the second optical input transmission is zero and between −3 dB and +10 dB when the power of the second optical input transmission is at a nominal level.

9. A method of optical network management, comprising:
connecting a first egress port of an optical amplifier to an optical network, the first egress port configured to provide first optical output transmissions in the multiple transmission bands;
connecting a second egress port of an amplifier noise source to a first port of first ingress ports of the optical amplifier, the first ingress ports configured to receive optical transmissions in multiple transmission bands, the first port of the first ingress ports configured to receive a first optical input transmission in a first band of the multiple transmission bands; and
wherein a second ingress port of the amplifier noise source is configured to:
 receive a second optical input transmission in the first band; and
 generate the first optical input transmission by amplifying a combination of a bulk noise and the second optical input transmission, a magnitude of the amplification being dependent on a power of the second optical input transmission.

10. The method of claim 9, wherein:
the bulk noise comprises amplified spontaneous emission noise of the amplifier noise source.

11. The method of claim 9, wherein:
the amplifier noise source comprises a constant power amplifier.

12. The method of claim 9, wherein:
the amplifier noise source is configured to maintain, as the power of the second optical input transmission increases to an operating level, a power of the first optical input transmission within a specified range.

13. The method of claim 9, wherein:
the first band comprises the L-Band.

14. The method of claim 9, further comprising:
connecting the second ingress port to an L-Band Optical Add/Drop Multiplexer.

15. The method of claim 9, further comprising:
connecting a second port of the first ingress ports to a C-Band Optical Add/Drop Multiplexer.

16. The method of claim 9, further comprising:
generating a bulk first optical input transmission by amplifying the combination of the bulk noise and the second optical input transmission.

17. The method of claim 16, wherein:
the second optical input transmission is channelized.

18. The method of claim 9, further comprising:
transitioning from the bulk first optical input transmission to a channelized first optical input transmission by increasing the amplitude of the second optical input transmission.

* * * * *